United States Patent
Morimura

(10) Patent No.: US 6,508,942 B2
(45) Date of Patent: *Jan. 21, 2003

(54) SOLID-LIQUID FILTERING METHOD AND SYSTEM FOR SEWAGE, WASTE WATER AND THE LIKE

(75) Inventor: Tadaki Morimura, Osaka (JP)

(73) Assignee: Morimura Kousan Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/524,387

(22) Filed: Mar. 13, 2000

(65) Prior Publication Data

US 2002/0033371 A1 Mar. 21, 2002

(30) Foreign Application Priority Data

Dec. 20, 1999 (JP) .............................. 11-360936
Dec. 21, 1999 (JP) .............................. 11-362259

(51) Int. Cl.$^7$ ............................................. B01D 37/00
(52) U.S. Cl. ..................... 210/767; 210/798; 210/505; 210/483
(58) Field of Search .................... 210/767, 780, 210/791, 797, 798, 503, 508, 505, 483

(56) References Cited

U.S. PATENT DOCUMENTS

| 605,234 | A | * | 6/1898 | Sherk |  |
|---|---|---|---|---|---|
| 2,076,980 | A | * | 4/1937 | Cooper | 210/204 |
| 3,238,124 | A | * | 3/1966 | Burton | 210/503 |
| 3,815,341 | A | * | 6/1974 | Hamano | 55/477 |
| 3,977,847 | A | * | 8/1976 | Clark | 55/488 |
| 4,167,482 | A | * | 9/1979 | Müller | 210/503 |
| 4,294,694 | A | * | 10/1981 | Coulthard | 210/150 |
| 4,416,782 | A | * | 11/1983 | Kerres | 210/634 |
| 4,851,136 | A | * | 7/1989 | Fanqing et al. | 210/798 |
| 5,085,766 | A | * | 2/1992 | Born | 210/150 |
| 5,942,113 | A | * | 8/1999 | Morimura | 210/487 |

FOREIGN PATENT DOCUMENTS

EP  0 119 340 A1  9/1984

* cited by examiner

Primary Examiner—Robert J. Popovics
(74) Attorney, Agent, or Firm—Armstrong, Westerman & Hattori, LLP

(57) ABSTRACT

A solid-liquid filtering method and system which comprises a thick band (7) of assembled filaments prepared by closely arranging paralleled monofilaments of predetermined length, a means for fixing (11) one end portion of said band and a network support (4) for keeping said band in a plane situation at proper location when said band is forced to turn in a regular direction, one end portion of said monofilaments being fixed and the other end portion being floated.

6 Claims, 4 Drawing Sheets

SOLID-LIQUID FILTERING METHOD AND SYSTEM FOR SEWAGE, WASTE WATER AND THE LIKE

This application claims priority under 35 USC 119 to Japanese Application No. 11-360936, filed Dec. 20, 1999, and Japanese Application No. 11-362259, filed Dec. 21, 1999.

BACKGROUND OF THE INVENTION

1. Field of the Invention

This invention relates to a solid-liquid filtering method and system for sewage, waste water and the like.

2. Prior Art

According to a conventional solid-liquid filtering process, solid containing liquid has been filtered off through porous filter media such as woven fabric, gauze or mesh, knitted fabric, penetrable membrane and the like. Liquid to be filtered is passed through a filter medium from one side to be other side thereof by loading, pressing, evacuating, centrifuging and the like, thereby solid being captured by pores if the solid particle is Larger than the pore size.

In the conventional system for conducting the above-mentioned filtering process, the liquid is basically forced to pass through a filter from one side to the other. Average solid particle size in the liquid varies depending on kinds of liquid to be filtered while each filter medium has its inherent pore size fallen in a certain range. When the liquid contains solid of various particle sizes, it is necessary to change filter media with an increase or decrease in the particle size. Further, the liquid to be filtered is restricted by a specific filtering system if its filter medium is not changed, which inconveniently reduced applicability of the filtering system.

Filtered solid particles are gradually accumulated on the filter media with the elapse of filtering process to cause clogging of the filter. Such a clogging situation decreases the filtering effect and finally halts filtration. As the liquid is forced to pass through the filter media as described above, solid is strongly captured by filter pores. The finer the solid particle becomes, the more frequently such clogging occurred.

It is not economical, efficient nor practical from an operational standpoint to use a filter medium to its filtering capacity because such a medium is no longer reusable. For that reason, clogged filter media are usually washed to remove filtered off solid particles and reused repeatedly. In order to solve problems caused by clogging, a fixed filter medium is subjected to so-called back washing by forcibly passing wash-water through the medium in the backward direction, or clogged solid particles are forcibly blown offer sucked out by means of a conventional device.

Although back-washing is a simple and convenient treatment for clogging, such a treatment should be conducted at a high water pressure by using a large amount of water for a long period of time when pore size of the filter medium is considerably small, or when solid particles are excessively fine or adhere strongly to the medium. The filter medium is sometimes used continuously even under an inefficient condition as described above, or a washing period should be shortened unavoidably.

On the other hand, an application of a specific device for washing would increase the production cost and decrease the operational efficiency.

According to the present invention, it is possible to filter off solid of normal to superfine particles through a novel type of filter media which can be easily and completely washed by conventional back-washing. The present invention provides a novel solid-liquid filtering method and system which exceeds the conventional concept of filtration.

SUMMARY OF THE INVENTION

An object of the present invention is to provide a solid-liquid filtering method in which liquid to be filtered is passed through a thick band of assembled filaments to filter off and capture solid by supplying liquid in the direction of filament retainment, said band comprising closely paralleled monofilaments of predetermined length, one end portion of which being fixed and the other end portion being floated so as to keep said band in a plane situation at proper location by a support only when each filament is forced to turn in a regular direction.

Another object of the present invention is to provide a solid-liquid filtering means which comprises a thick band of assembled filaments prepared by closely arranging paralleled monofilaments of predetermined length, a means for fixing one end portion of said band and a network support for keeping said band in a plane situation at proper location when said band is forced to turn in a regular direction, one end portion ef said monofilaments being fixed and the other end portion being floated.

DETAILED DESCRIPTION AND THE PREFERRED EMBODIMENTS

Figure 1:
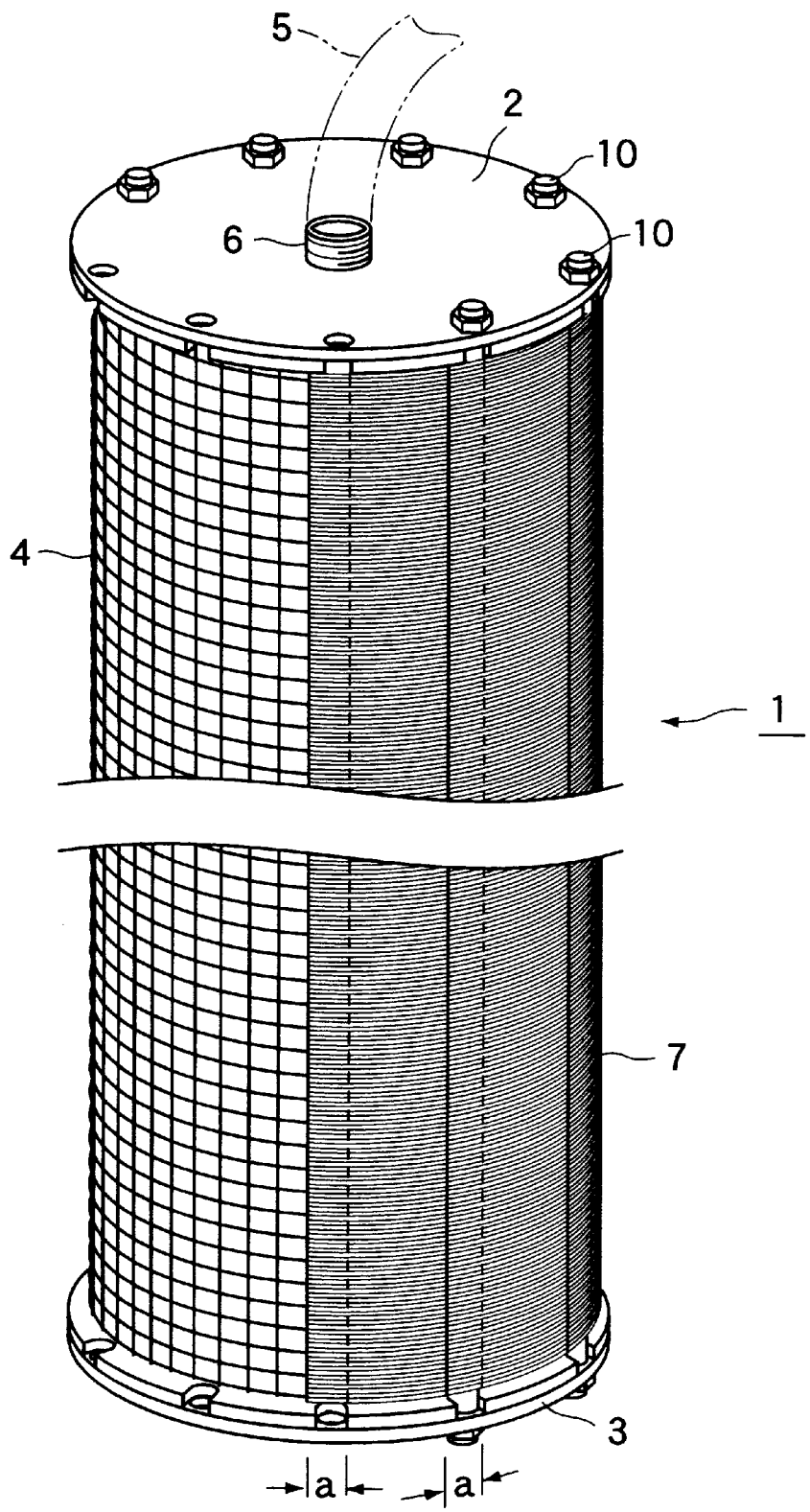
FIG. 1 is a perspective view of the present solid-liquid filtering system.

According to the present invention, gaps are formed between each contact surface of closely paralleled neighboring monofilaments, which function as pores formed on conventional filter media.

A filtering surface can be controlled by changing diameter of monofilaments, and thus, thickness thereof may be selected depending on particle size of solid to be filtered off.

Fine filtration comparable to membrane- or ultrafiltration can be conducted by means ultrafine monofilaments.

The above mentioned filter medium of novel type allows to easily induct high-level filtration, while back-washing thereof is also carried out quite simply and completely. As only one side portion of monofilaments is fixed, the other side portion is released from a network support by back-washing water which is supplied in the backward direction against a flow of filtrate, while the washing water allows the filaments to forcibly float and spread therein. As distance between each filtering surface is forced to spread by the washing water, solid particles captured on a band of assembled filaments during the filtration process are released the therefrom without difficulty, thereby the filter medium being regenerated easily.

As decried above, the present filtering method and system makes it possible to wash and regenerate the filter medium quite easily and completely in any case by conventional back-washing while the level of membrane- or ultrafiltration can be kept.

Monofilaments used by the present invention may be those filaments made of conventional materials preferably including plastics, carbon fiber, metal fiber and the like, although there should be selected a specific materials suitable for properties of liquid to be filtered as a matter of course.

Thickness of monofilaments is not in particular limited by the present invention, but excessively thick filaments decrease the operational efficiency because of less contact surface formed between them and are not suitable for conducting high-level filtration of the present invention. The monofilaments are preferably 0.3 mm or less in diameter for the purpose of conducting high-level filtration of the present invention, although the operational efficiency increases much more with a decrease in thickness of the monofilaments.

Further, a network support for the band of assembled monofilaments is not restricted by the present invention except some technical practices such as that a mesh thereof is not larger than thickness of the monofilaments to prevent an intrusion thereof into the network, the support is made of materials resistant to liquid to be filtered and the like.

According to the present invention the filter medium is washed and regenerated by simply supplying back-washing water in the backward direction against the liquid flow, which minimizes technical and economical inconveniences caused by back-washing. A step of back-washing can be repeatedly conducted during the filtration process without the consideration loss of efficiency. In other words, such an intermittent introduction of back-washing step does not affect the filtration process seriously. One of the most characteristic feature of the present invention resides in the simple and complete back-washing.

The hand of assembled monofilaments is effectively used in the present invention as a novel type of filter medium as described above and also functions as a butterfly valve which is conventionally used in similar methods and systems.

It is theoretically possible to fix both ends of a filter medium during the filtration process, release one of these ends in the subsequent back-washing step and then fix it again to continue further filtration. Such a process, however, is not practical and contrary to the spirit of the present invention.

EMBODIMENTS

Referring now to the drawings, the present invention will be further described by the following embodiments.

Figure 2:
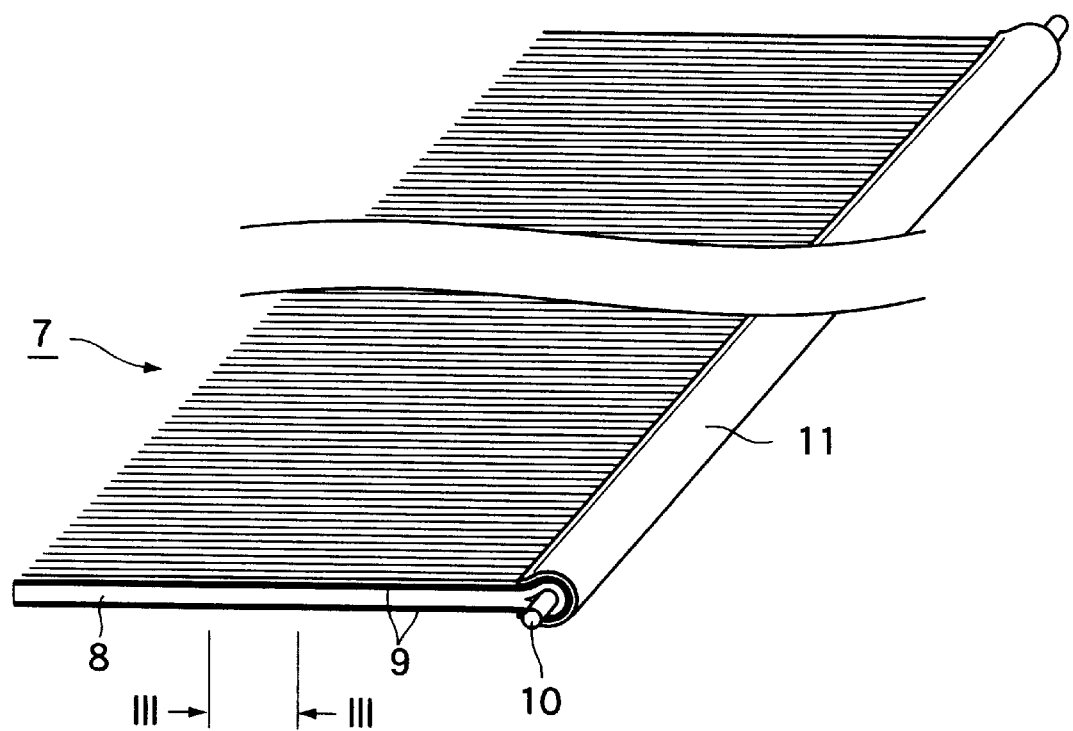
FIG. 2 is a perspective view of a filter medium of the present solid-liquid filtering system.
Figure 3:
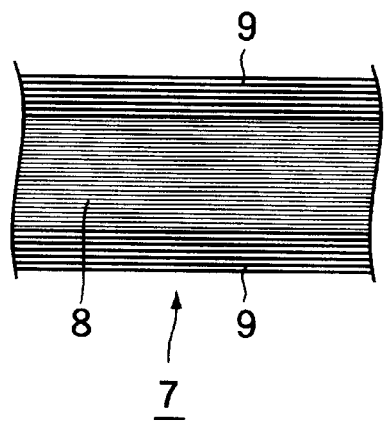
FIG. 3 is a partially enlarged side view of a short side portion of the filter medium shown in FIG. 2 (taken on line III—III in FIG. 2).

FIG. 1 is a perspective view of the present solid-liquid filtering system,

FIG. 2 is a perspective view of a filter medium of the present solid-liquid filtering system, and FIG. 3 is a partially enlarged side view of a short side portion of the filter medium shown in FIG. 2 (taken on line III—III in FIG. 2).

In FIG. 1, a series of bands of assembled monofilaments are partially taken off for better understanding.

1 designates a cylindrical basket-like frame made of stainless steel as a part of the present system. The frame 1 is about 450 mm in length and about 140 mm in diameter.

The frame 1 is provided with sealing lids 2 and 3 made of stainless steel on the top and bottom opening and a stainless wire screen 4 of about 1 cm mesh stretched thereon. The upper lid 2 is provided with a fitting 6 for detachably connecting an drawing pipe 5.

7 designates a filter medium. As shown in FIGS. 2 and 3, the filter medium 7 comprises an inner layer of about 1.5 mm thickness prepared by closely assembling aramid monofilaments 8 (TECHNORA, TEIJIN LIMITED, trademark) of about 150 mm in length and about 0.012 mm in diameter prepared by closely assembling aramid monofilaments and folding them into two to form a layer of about 1.5 mm in thickness as a whole, an outer layer of about 0.5 mm in thickness prepared by arranging polypropylene monofilaments 9 of about 0.3 mm in diameter on the inner layer, a stainless rod 10 of about 470 mm in length for holding the center of both monofilaments layers, and a sleeve clip 11 for fixing these layers on the rod 10, the thickness of the filter medium 7 being about 2.5 mm as a whole. Thicker monofilaments of the outer layer are used to settle the inner layer of thinner monofilaments as an essential filter medium and do not contribute to filtration directly. Accordingly, the outer layer is not necessarily essential to the present filtering system. Measure of the filter medium 7 is about 450 mm in length, about 70 mm in width and about 2.5 mm in thickness.

Nine filter media 7 are mounted on a wire screen 4 stretched around a cylindrical basket-like frame 1 so that respective free end portions of these media 7 overlap the adjacent sleeve-clipped end portions each other as shown in FIG. 1. Overlapped width shown by "a" in FIG. 1 is about 20 mm. Each of stainless 10 is fitted in the periphery of top and bottom lids 2 and 3 of the frame 1. In this case, each of the filter media 7 is rotatable around the stainless rod 10 as a rotating shaft. The filter media 7 may be fixed to the frame 1 so that the media as a whole are not rotatable but only monofilaments are free and floatable.

The present filtering system of the above-mentioned structure is almost in an airtight situation by means of the filter media 7 and the top and bottom lids 2 and 3 except the fitting 6, and is completely sealed when the drawing pipe 5 is connected thereto.

A filtering method of the present invention using the above-mentioned system will be described in the following.

After the drawing pipe 5 was fitted to the fitting 6, the filtering system was immersed in a stirred 30,000 ppm-mountain soil suspension in water. The drawing pipe 5 was connected to a small sized 8 liter/min. duty-suction pump to conduct filtration under a vacuum condition. The suspension was subjected to filtration at a filtering rate of 2.0 to 3.0 liter/min. and yielded considerably clear water.

The first filtering step was discontinued after ten minutes-filtration, while the filter media 7 were back-washed for one minute by flowing water in the backward direction against the flow of filtering liquid. Such a combined process of ten minutes-filtration followed by one minute-back-washing was repeated continuously. As a result, clear water as a filtrate was obtained at a filtering rate of 110 to 160 liter/hour or about 3,200 liter/day.

Figure 4:
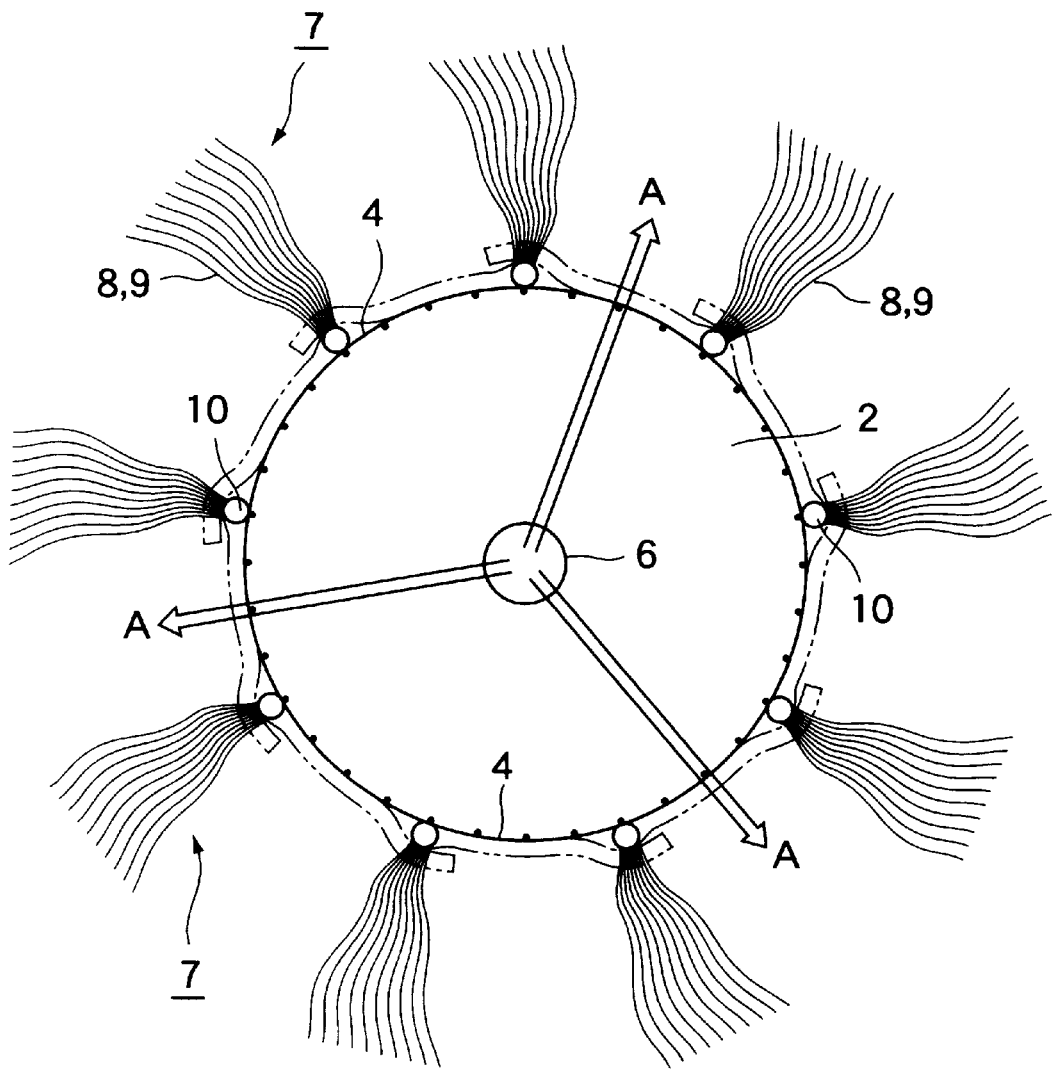
FIG. 4 is a schematic sectional view of the present solid-liquid filtering system under a back-wash condition.

When back-washing water (tap water) A was violently passed through the filtering system from inside to outside thereof, monofilaments of the filter media 7 were released from outward of the wire screen 4 floated in the water as shown in FIG. 4, which was then entrapped into irregular gaps between each monofilament to remove filtered solid accumulated thereon and regenerate the filter media 7 completely.

Figure 5:
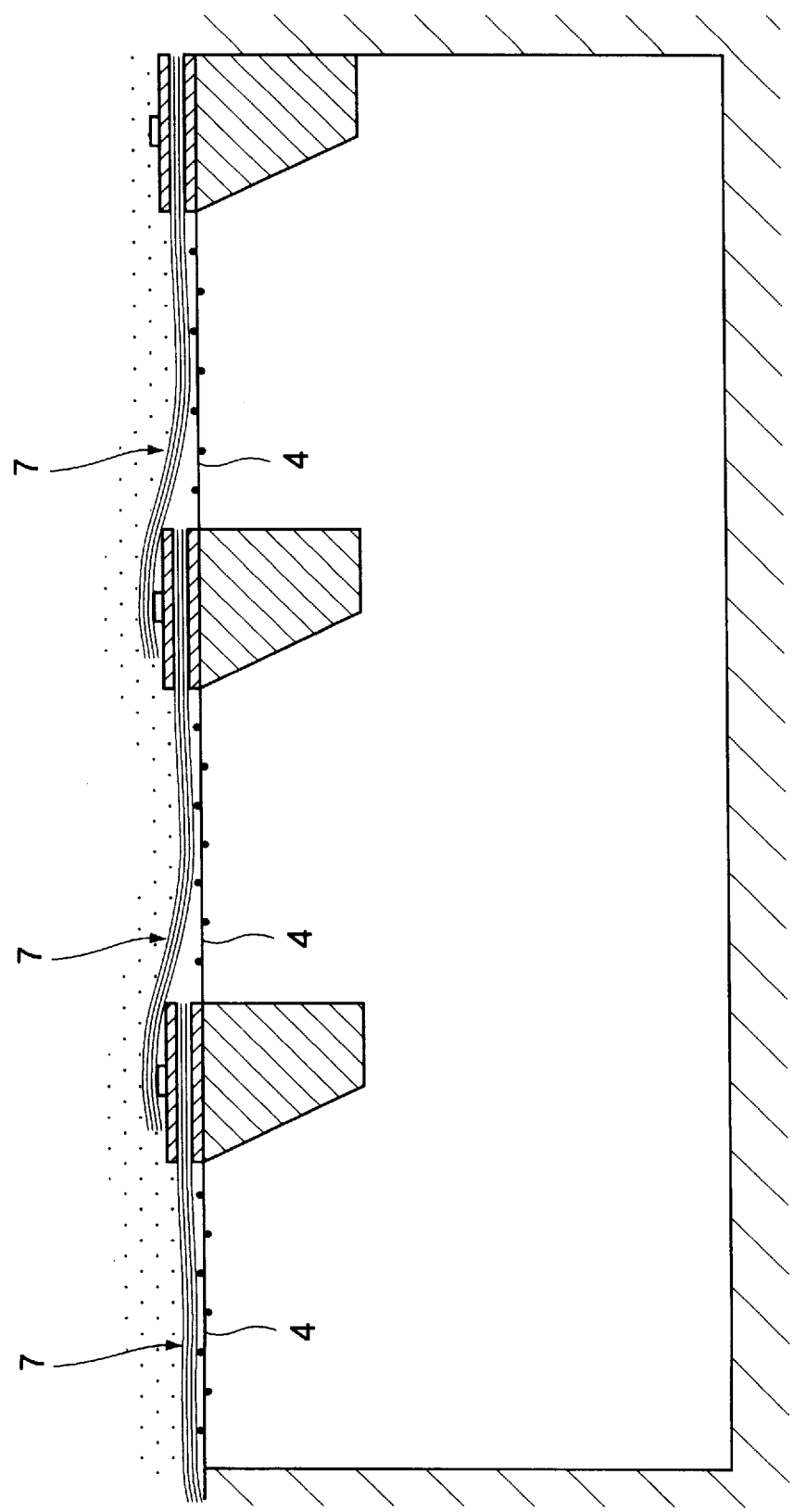
FIG. 5 is a schematic illustration of a solid-liquid filtering system according to another embodiment of the present invention.

Another embodiment of the present invention is shown in FIG. 5. Each filter medium 7 is flatly arranged on and fixed to one side portion of a chamber. According to this embodiment, effective suction filtration and back-washing are conducted by supplying liquid to be filtered and back-wash water one after the other through a fitting (not shown) fixed on the chamber in a similar manner as described above.

What is claimed is:

1. A solid-liquid filtering method in which liquid to be filtered is passed through a series of bands of assembled monofilaments, to filter off and capture solids, by supplying liquid therethrough, each said band comprising an inner layer of monofilament of a predetermined length and a first diameter, as a filter medium, folded in two about a rod adjacent a frame to provide two outer surfaces, and free ends, and an outer layer of monofilaments having a second diameter larger than said first diameter, on each of said outer surfaces, such that the outer layer of monofilaments having the larger diameter settles the inner layer of monofilaments on said frame during filtering to capture solids.

2. A solid-liquid filtering method claimed in claim 1 wherein a band of assembled filaments is washed intermittently during a filtering process by supplying washing water in the backward direction against a flow of liquid to be filtered.

3. A solid-liquid filtering method claimed in claim 1 wherein said monofilaments are 0.3 mm or less in diameter.

4. A solid-liquid filtering method claimed in claim 1 wherein solid monofilaments are made of plastics.

5. A solid-liquid filtering method claimed in claim 1 wherein the said monofilaments are made of carbon fiber.

6. A solid-liquid filtering method claimed in claim 1 wherein the said monofilaments are metal monofilaments.

* * * * *